Dec. 13, 1960

D. A. BANGE

2,964,743

PROGRAMMING DEVICES

Filed Nov. 29, 1957

INVENTOR
DONALD A. BANGE

BY Louis A. Kline
Albert L. Sessler, Jr.

HIS ATTORNEYS

Dec. 13, 1960   D. A. BANGE   2,964,743
PROGRAMMING DEVICES
Filed Nov. 29, 1957   5 Sheets-Sheet 4

FIG. 4C

INVENTOR
DONALD A. BANGE
BY
HIS ATTORNEYS

FIG. 4D

United States Patent Office 2,964,743
Patented Dec. 13, 1960

2,964,743
PROGRAMMING DEVICES

Donald A. Bange, Dayton, Ohio, assignor to The National Cash Register Company, Dayton, Ohio, a corporation of Maryland Filed Nov. 29, 1957, Ser. No. 699,844

11 Claims. (Cl. 340—365)

This invention relates to programming means, and more particularly relates to programming means in which a multiple-level switching device is arranged to provide a plurality of different programs at a single group of output terminals.

Due to the widespread use of automatic control or "automation" of various types of mechanisms by business and industry, a great need and demand has arisen for simple, effective, and inexpensive programming means, since a programming device is necessary in most automatic control systems where a number of operations are to be performed sequentially.

One of the more common types of such programming device utilizes the stepping switch, which comprises a plurality of contact positions and a wiper which is driven to step sequentially from position to position. Stepping switches may include a number of levels, each level having a number of contact positions, and a wiper to step through the various positions. In a multiple-level switch, the wipers are customarily operated in unison by a single driving means, so that all of said wipers are always correspondingly positioned on the various levels. The wipers are electrically isolated, each from the other, and each wiper is provided with a different input conductor, so that an input signal may be selectively applied to any one of the wipers. All of the contact positions of each level are normally connected by conductors to a program board having receptacles or other suitable means to provide a program control whereby the contact positions of the switch may be effectively connected to the various system components which it is desired to operate or control in a sequential manner.

In the past, it has been customary to have the contact positions of each level of a multiple-level stepping switch connected to a separate area on the program board to enable them to be connected in the desired sequence to the components they are to operate or control. Therefore this programming system, embodying a multiple-level stepping switch, while effective and capable of performing the necessary functions, and having a maximum of flexibility, does require a plurality of program board areas, one for each level of the stepping switch, and also requires wiring, with its incident costs for labor and material, for each level of the stepping switch to its corresponding area of the program board, for every contact in that level.

The present invention provides a means whereby a number of different programs may be obtained from a program board area corresponding to a single stepping switch level by utilizing a multiple-level stepping switch and providing conductors on said switch which interconnect contacts on different levels and in turn are connected to the terminals of the program board. Then, different programs may be obtained by applying input signals to different individual wipers of the stepping switch, according to which switch level it is desired to utilize. As the wiper steps sequentially from contact to contact on the selected level, the signal is carried through that contact and over the conductor connected to it, to the corresponding program board terminal. Thus input signals appear on the program board terminals in an order corresponding to the arrangement in which the conductors are connected to the contacts of the selected level. Since the arrangement in which the conductors are connected to contacts will vary from level to level, a different program is obtained each time the stepping switch steps through a complete cycle with an input signal applied to a different wiper. A plurality of programs, or different sequential routines, for operation or control of the various system components are thus obtained from the single set of terminals on the program board.

The several contacts of the various levels of the stepping switch may be interconnected in any desired arrangement. In one such arrangement, illustrated herein, the contact-connecting conductors extend diagonally of the rows formed by the contacts on the various levels of the stepping switch, and in parallel relationship. However it should be realized that this arrangement is only one of many possible arrangements and should not be construed as a limitation on the invention. With the illustrated arrangement of the inter-connecting means, the sequential relationship of operation of the various components in the different programs available will not be changed, but certain of the components will not be operated or controlled during certain of the programs. For example, if the various available components be designated as A, B, C, and D, then a first program might control the components A, B, C, and D in that order. A second program would not operate or control component A but would operate or control components B, C, and D in that order, while a third program might operate or control only the components C and D, and a fourth program would operate or control only the component D.

Additional flexibility and variety in programming is provided in the present invention by a novel optional resetting means. This enables the selected program to be terminated prior to its normal completion, and thus in effect provides additional programs.

The programming device of the present invention is illustrated herein as being applied to a data processing system. In this system, the programming device acts to control the reading-out of certain orders or denominations of information in a specified order, and the various available programs differ in the number of denominations or orders which are read out. It should be emphasized that while the programming device of the present invention may frequently and effectively be used in data processing systems, it may also find use in any other applications, such as control of production machinery, etc.

One object of the present invention is therefore the provision of means for selectively providing a plurality of different programs at a single group of output terminals.

Another object is to provide a programming device comprising a matrix of contacts arranged in rows and levels, a plurality of conductors extending diagonally across the matrix in parallel relationship and interconnecting the contacts in successive rows and levels, a set of output terminals connected to the conductors, and means for applying an input signal sequentially along a selected one of the levels so that different program sequences may be obtained on the single set of output terminals by the application of input signals to different levels.

A further object is the provision of a multiple-level switching device connected to a single group of output terminals and arranged to provide a plurality of programs on the single set of output terminals.

An additional object is to provide a programming device in which a selected program may be terminated prior to its normal completion.

Still another object is to provide a simple, effective and inexpensive programming device.

Still a further object is to provide a programming device comprising a multiple-level stepping switch in which conductors connect a plurality of different contacts of different levels in such a manner that a plurality of different programs may be taken from the conductors depending upon which one of the wipers of the stepping switch is energized.

With these and incidental objects in view, the invention includes certain novel features of construction and combinations of parts, preferred forms or embodiments of which will be hereinafter described with reference to the drawings which accompany and form a part of this specification.

Figure 2:
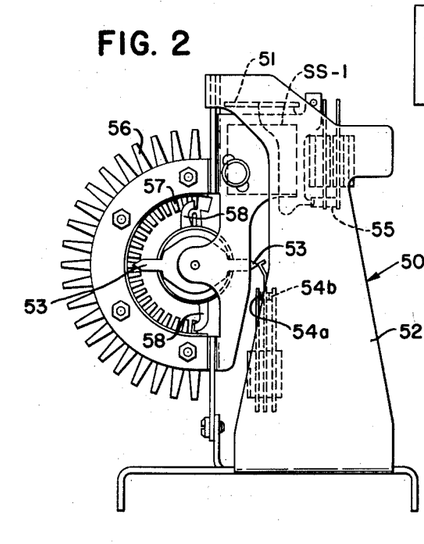
Fig. 2 is a side elevation of the stepping switch used in the present invention.

The programming device of the present invention utilizes a multiple-level, sequentially operable switch in order to provide a plurality of programs, each consisting of one or more different steps. Such a switch may be of the type commonly known as a stepping switch, one form of which is illustrated in Fig. 2. The switch which is shown as a part of the illustrated embodiment of the invention is an 8-level, 20-position switch, although it is obvious that a similar switch could be constructed, having any desired number of levels and positions without departing from the invention. Provided for the switch 50 of Fig. 2 is a stepping magnet SS1 and the usual wiper driving means, which is operated by the magnet armature 51, and is conditioned when the magnet is energized, and is operated and causes the wipers to be advanced when the magnet is deenergized. A bracket 52 forms means for mounting the switch 50. A pair of cams 53, which are secured to the wipers to be rotated therewith, cooperate with sets of contacts 54a and 54b so that the contacts 54a are closed in all positions of the stepping switch except the home position, and contacts 54b are opened in all positions of the stepping switch except the home position. The armature 51 also operates two banks of contacts, shown generally at 55, some of which are closed when the magnet SS1 is energized, and others of which are opened when said magnet is energized. The above contacts are utilized in the circuitry of the system in which the programming device is employed, which in the illustrated embodiment of the invention is the recorder operating circuit.

A single level of the switch is used for each program, the level I being used for program I, level II being used for program II, etc. The eight levels of contacts of the stepping switch may, therefore, be used to obtain the necessary controls for eight programs, the longest of these programs being capable of providing up to eighteen steps in a program sequence, plus a step for resetting.

The individual contacts 56 of each level are arranged in co-planar relationship with each other, and have inner portions 57 extending into the path of movement of the wiper 58 of the corresponding level of the stepping switch. The wipers 58 for the various levels are electrically isolated from each other. The outer portions of the contacts 56 extend radially out from the center of rotation of the wipers 58 and are shaped so that electrical conductors may readily be connected thereto. It will be noted that two wipers 58, as well as two cams 53, are provided, so that when one of the wipers has completely traversed the semi-circular array of contacts, it is not necessary for this wiper to be rotated through another 180 degrees before the stepping switch may be utilized again. Instead, the second wiper is then in position to commence another operation of the stepping switch. The cams 53 operate in a similar manner.

Figure 1:
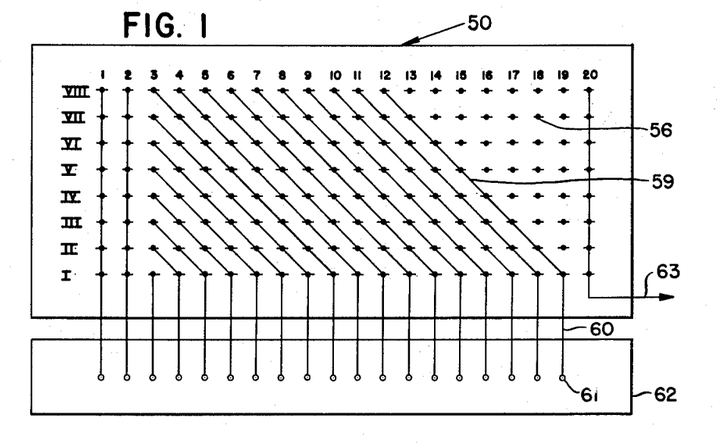
Fig. 1 is a schematic diagram of the manner in which the various contacts of the stepping switch used in the present invention are interconnected, and the manner in which the interconnecting means are connected in turn to the program board.

In the present invention, the contacts 56 of the various levels of the stepping switch 50 are interconnected by conductors, which in turn are connected to output terminals in a program board. This is shown diagrammatically in Fig. 1, where the stepping switch 50 is represented as a rectangle, in which the contacts 56 of the various levels are laid out in a rectangular grid pattern. The various levels are indicated at the left of Fig. 1 by Roman numerals I through VIII, while the contact positions in the various levels are indicated by numbers 1 through 20, arranged horizontally across the top of the rectangle representing the switch 50. Different contacts in the various levels are interconnected by conductors such as the conductor 59, and these conductors are connected over output conductors, such as the conductor 60, to output terminals 61 in a program board diagrammatically shown at 62 in Fig. 1. These terminals 61, in turn, may be connected to various components which it is desired to control in a sequential manner, such as various elements of production machinery or switches which may be set to represent data.

It will be seen from an examination of Fig. 1 that contact positions 1 and 2 of the various levels of the switch 50 are connected together, so that all of the contacts in these two positions are connected to corresponding contacts of the remaining levels. The remaining contact positions 3 through 19 of the various levels are interconnected in a diagonal or spiral arrangement. Hence, for example, the conductor 59 connects position 12 of level VIII, position 13 of level VII, position 14 of level VI, position 15 of level V, position 16 of level IV, position 17 of level III, position 18 of level II, and position 19 of level I. At the various contact positions of level I, the conductors 59 are connected to the output conductors 60, so that all of the contacts 56 interconnected by any one conductor 59 are connected over the conductor 60 to a single terminal 61 in a program board 62. It will be recognized that the spiral or diagonal arrangement of the conductors 59, as shown in Fig. 1 is purely exemplary, and that the contact positions of the various levels could be interconnected in any desired arrangement. It will also be realized that the conductors 59 and 60 may, if desired, be the same conductor. In the illustrated embodiment, a conductor 63 interconnects all of the contacts of the various levels of position 20, and this conductor is not connected into the program board 62, but is carried back into the recorder operating circuit (Fig. 4A), to perform a control function.

The wipers 58 of the various levels of the stepping switch 50 operate in unison, so that all of said wipers are always positioned at the same contact position in the various levels. It will, therefore, be seen from an examination of Fig. 1, that by selecting different levels of the switch 50, and applying voltage to the wipers of the selected levels, different sequences of signals or pulses at the various output terminals 61 of the program board 62 may be obtained, thus providing varying programs, according to which of the levels of the stepping switch is selected. For example, with the wiring pattern shown in Fig. 1, if level I is selected, and its wiper energized, signals will be applied to the output terminals 61 corresponding to all of the contact positions 1 to 19 in proper sequence. However, if level VII is selected, and voltage applied to its wiper, it will be applied first to the output terminals 61 corresponding to contact positions 1 and 2, and then to output terminals 61 corresponding to contact positions 9 to 19 in sequence. No signals will be applied to the output terminals 61 corresponding to contact positions 3 through 8. It will, therefore, be seen that selection of level I provides a program in which components connected to all nineteen of the output terminals 61 are operated in sequence, while level VII provides a program in which certain of the components connected to the terminals 61 are operated, and in which certain others of said components are not operated.

In a similar manner, selection of other levels of the stepping switch will provide different sequences of signals or pulses on the output terminals 61. It will also be seen that any desired combination of different sequences of signal input to the output terminals 61 may be obtained by connection of contacts 56 of the various levels with a conductor such as 59 in the proper arrangement. A simple and effective means is thus provided for producing a variety of signal sequences on a single set of output terminals by appropriate wiring of the various contacts of different levels of the multiple-level switching device, and application of voltage to the wiper of a desired level of said switching device.

The switching device of Figs. 1 and 2 may be embodied in a system such as that shown in the circuit diagram of Figs. 4A, 4B, 4C and 4D. This system is utilized in the processing of data, and is similar in many respects to the system described and claimed in the United States application for Letters Patent, Serial No. 550,728, filed December 2, 1955, now Patent No. 2,896,713, inventor Elmer A. Gerdemann. In this description only those parts of the data processing system shown in the diagram of Figs. 4A to 4D inclusive, which are germane to the present invention, will be described in detail, and for a description of the remainder of the system, reference may be had to the previously cited United States application, Serial No. 550,728.

Broadly speaking, this data processing system provides means for recording in sequential form, on a tape, data derived from a key-controlled machine. If desired, the data to be recorded may also be derived from a record card or tag by means of a media reader, not shown herein.

This system, as described in the previously cited application, Serial No. 550,728, includes a recorder which can produce the punched tape, and a key-controlled data input machine, on which data can be set to control the recorder to cause a corresponding code to be punched on the tape. The recorder and the data input machine are connected by cables for joint operation, and may be either separate units, or may, if desired, be contained in a single cabinet.

The recorder consists of a number of components, each of which performs a specific function during operation of the recorder. One of these components is the tape punch unit, which performs the actual perforation of the tape by means of a plurality of slender rods or punches. One punch is provided for each channel of the tape, and punching by these punches is controlled, through mechanical coupling, by a plurality of punch selecting magnets. If a punch selecting magnet is energized, its associated punch will punch a hole in its tape channel during the punch cycle of operation. The punch selecting magnets are energized by means to be subsequently disclosed. Other elements, including a motor, a tape feed reel, and a tape take-up reel also form part of the tape punch unit.

A rectifier forms another component of the recorder. Power, which is supplied to the recorder from an alternating current source, is applied to the recorder motor and to the input of the rectifier, which changes the current for use in all other parts of the recorder circuit.

A stepping switch, such as described above, is a third component of the recorder. This sequentially selects different connections in a circuit by means of the wipers 58, which are mechanically driven step by step in response to the action of the magnet SS1. Essentially, it is the stepping switch that determines the sequence in which the information will be punched into the tape. The information associated with the electrical circuit connected to the first position of the stepping switch will be recorded first, that related to the circuit connected to the second position of the switch will be recorded second, and so on. After all of the desired information in the sequence has been recorded, the wiper is caused to reset to its original, or home, position. If the circuit associated with certain information is not connected to a position of the stepping switch, that information will not be recorded in the sequence.

The information selected to be recorded, and the sequence in which it is recorded, is termed a "program." Each level of the stepping switch provides a different program, and electrical selection of a particular program is accomplished by applying voltage to the wiper of a particular level, and withholding voltage from the remaining wipers. Except for certain special operations, such as punching a "run-in" code into the tape, or recording data from a media reader, the stepping switch is used whenever recording takes place.

In order to obtain sufficient flexibility to meet many different business needs, the data processing system shown here incorporates means which permits it to be quickly and easily altered to fit these various applications. This process of alteration, since it involves setting up different programs, is called "programming." This programming is electrical in nature and is accomplished by interconnecting selected points in the electrical circuit of the recorder and its associated equipment. Interconnections can readily be made because these points have been extended from within the recorder and terminated on an easily accessible, rectangular block, called a "program board." Physically, the program board is made up of two sections, mounted one above the other in the recorder. These sections are made of an insulating material into which a number of metallic receptacles have been embedded. These receptacles are arranged in a uniform pattern and extend completely through the program board from front to back. Points of the electrical circuit are brought out and connected to the receptacle at the rear of the board. Programming is accomplished by connecting double-ended conductors, called plugboard connectors, between the proper terminals on the front of the program board. To assist in locating these terminals, the vertical columns of terminals are lettered and the horizontal rows are numbered. Once the program board is wired it need not be changed, so long as the recording system is used for the same applications.

In order to operate with different types of data processing machines, it is necessary that the recorder be able to punch codes used by the different data processing machine manufacturers. The process of setting up the recorder to punch a particular code is termed "encoding." This process is accomplished by the insertion into the recorder of a single unit, sometimes called the "diode encoding unit," which contains one or more diode encoding boards. Conductors which carry signals relating to information from the data input machine are connected to the diode encoding board, as are conductors connected to the various punch selecting magnets of the tape punching means. The information-carrying conductors are then connected to the conductors for the punch selecting magnets, according to the desired code, by means of diodes which fit into receptacles in the diode encoding board. Diodes are used in order to prevent back currents in the recording circuits, which would otherwise cause erroneous punching of data.

Adding machines, accounting machines or cash registers are examples of the types of data input machines which may be used to provide the data input to the data processing system described herein. Certain additional controls and switches are required to adapt standard adding machines, accounting machines, or cash registers, for use in this type of system.

Data input machines for use with the recorder described herein must customarily include control switches, which are added to allow the machine operator or a machine mechanism to control the times when voltage is applied to the recording system. Examples of these switches are a power switch, a recorder on-off switch, and a start-record switch. The power switch is normally a toggle switch, which allows the machine operator to turn the system on or off by controlling the A.C. voltage applied to both the machine and the recorder. The recorder on-off switch controls the application of power to the recorder to allow the data input machine to operate without the recorder. The start-record switch is an open leaf type switch, which allows a machine mechanism to initiate the recording cycle at the proper time in the machine cycle by controlling the D.C. voltage to the system.

Selector switches must also be present in a data input machine in order to apply voltage to selected connections in the system, according to the data to be recorded. The selector switches are actually controlled by associated parts of the machine mechanism, which are in turn controlled by the operator from the keyboard or other suitable setting means.

Certain of the selector switches are program selector switches, which permit the operator to select a particular program by setting one or more of the program selector switches to desired positions. This action causes voltage to be applied to the wiper of one of the levels of the stepping switch, while the other levels remain unenergized.

Other of the selector switches are data selector switches, which are set according to the data to be recorded. These switches can select circuits, which may be programmed to cause the data to be punched into the paper tape. The recording system is normally programmed so that a data selector switch causes a digit or other data to be punched, which corresponds to the position of the key depressed in its controlling key bank. If no key is depressed, the switch selects its zero position.

A terminal board, very similar to the recorder program board, also forms a part of the data input machine. In order to differentiate clearly between the two, the board in the data input machine will be termed a selection board. The purpose of the selection board is to accomplish, within the machine, the programming of the machine circuitry that is necessary. Using the selection board in this manner, rather than performing all the programming on the program board, permits a reduction in the number of wires that are necessary to connect the various components of the data processing system.

The mode of operation of the data processing system described herein will now be briefly described. The operator first indexes information pertaining to the transaction on the keyboard of the data input machine, and starts the operation of the machine mechanism. This mechanism, in addition to its standard functions, positions the contact arms of the program selector switches and the data selector switches. After these switches are properly positioned, voltage is applied to the program selector switches for the purpose of selecting one of the available programs. Only the desired program is selected because only one of the electrical conductors from the program selector switches to the stepping switch has voltage applied to it. Thus, only one level of the stepping switch is energized. At this time the machine mechanism is locked up under control of the control circuits. This lock-up prevents the machine from cycling again until the sequence of punching is completed; however, data for the next operation may be set up on the keyboard.

With one of its levels energized, the stepping switch starts scanning its contacts in a sequential manner. This action causes voltage to be applied in a predetermined sequence to the terminals 61 of the program board.

There are two main circuits available from the program terminals. If a program position is used to record a special symbol (such as an end of frame symbol) or a fixed digit (such as a machine number), the program terminals are connected directly to the points of the encoding section, which encodes the proper symbol or digit. Program terminals used to record keyboard information are connected to the data selector switches. Each of these switches has been differentially set to select a contact position determined by the key depressed in its controlling key bank. The switch contacts, in turn, are connected to the diode encoding system so that they encode a digit corresponding to their position. As seen from this operation, the function of the diode encoding section is to permit voltage to be applied to certain punch selecting magnets which will cause the tape punch to operate to record the desired data, either digit or symbol.

The tape punch is a motor-driven unit which is cycled under control of a single-revolution clutch. As the punch selecting magnets are energized, they set up mechanical conditions to cause the punches to punch the appropriate tape channels, and also apply voltage to the control circuits to the punch drive. This voltage trips the single-revolution clutch, causing the punch cam line to revolve. As the cam line of the punch cycles, the punches which have been mechanically readied by the energized punch selecting magnets perforate the paper tape. Accompanying each data punching is a tape feed sprocket hole, which is automatically punched during every cycle of the cam line.

In addition to the punching actions, the cam line opens a switch to interrupt the control circuits to the stepping switch drive, which causes the stepping switch contact arms to advance to the next contact position. From this contact of the energized level, the same circuit pattern is repeated, causing the coded data from this position to be punched, and again advancing the stepping switch contact arms. Data for the entire program is recorded in this manner.

When this information from the last data position has been recorded, the stepping switch contact arms advance to a position which is programmed to perform a "reset" operation. Voltage applied to this reset position causes the stepping switch wipers to return to their "home" position. At this time the control circuits unlock the machine mechanism and the system is ready for the next recording sequence.

Figure 3:
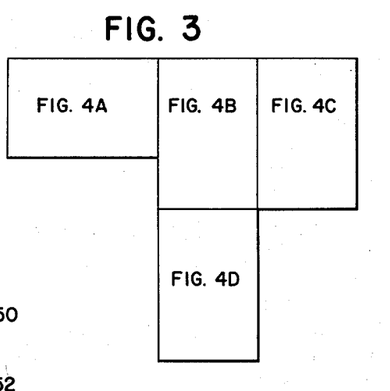
Fig. 3 shows the arrangement of the various sheets, including Figs. 4A, 4B, 4C and 4D which, taken together, form a circuit diagram.

As has been stated, the operating circuits for the data processing system are shown in Figs. 4A, 4B, 4C and 4D. The manner in which these figures may be assembled to represent the complete operating circuit is shown in Fig. 3. In these figures, certain switches, such as certain of the data selection switches of the data input machine, and certain levels of the stepping switch, which are mere duplicates of others, have been omitted, as their operation is substantially the same as those which are shown, and will be clear from the explanation of the operation of those which are shown. Also, certain portions of the circuit, such as the A.C. section, the rectifier, and the recorder operating circuit, shown to the left of Fig. 4A, have been shown herein as blocks rather than in detail, since these portions of the circuit are substantial duplicates of the corresponding portions shown in the previously cited United States application, Serial No. 550,728, to which reference may be had for a detailed explanation thereof.

In order that the explanation of the circuits will be more clear, they will be described generally as they function in preparing the apparatus for operation, and in carrying out typical operations of the apparatus. In this explanation it will be assumed that the data input machine and the recorder have previously been operated through a complete transaction, and are in "home" condition, ready to receive the entries of a new transaction.

Figure 4A:
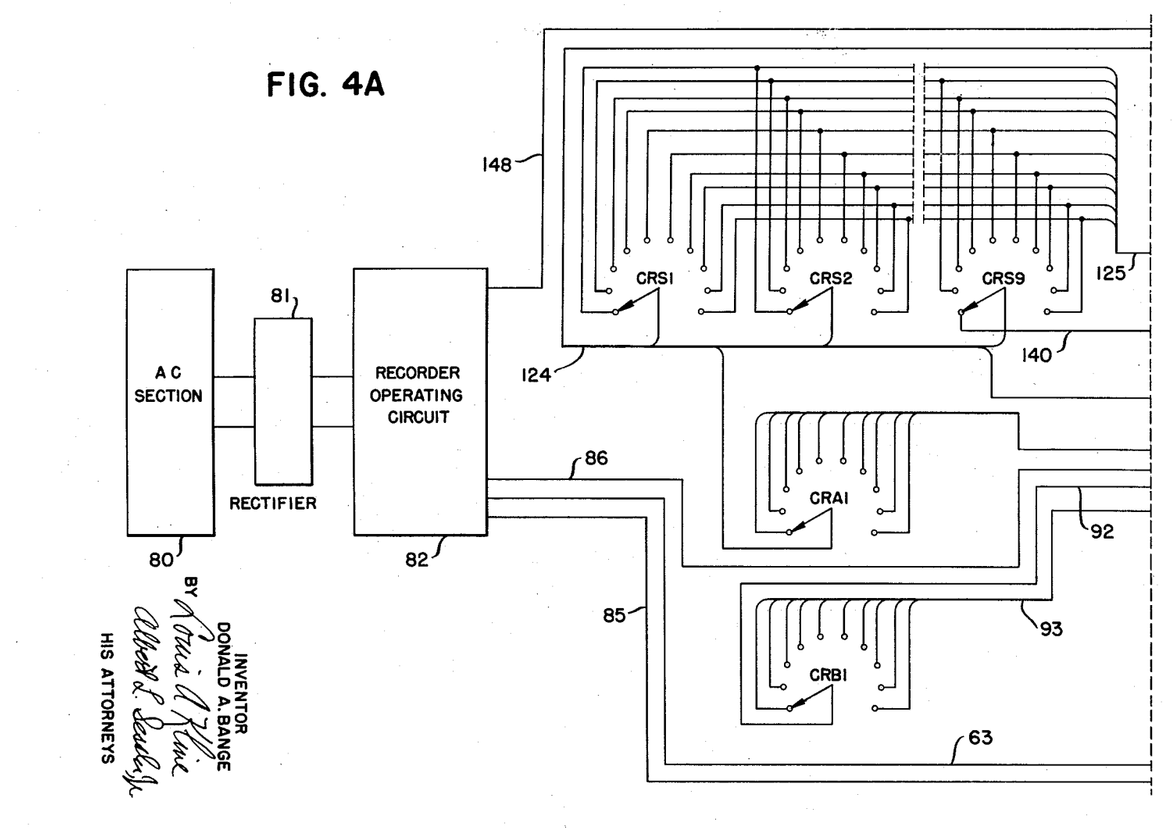
Figs. 4A, 4B, 4C and 4D, as stated above, form a circuit diagram of one system in which the novel programming device of the present invention may be utilized.

Power is turned on by closing the main power switch (not shown), which is located in the A.C. section 80 (Fig. 4A). The operation of this switch closes a circuit to make the usual 110 volts, 60-cycle, A.C. available to an operating motor for the data input machine, which motor is located in the A.C. section, and through the rectifier 81, to supply D.C. operating potential to the recorder operating circuit 82.

The preparation of the tape for use with most systems of auxiliary card punching equipment requires that a section, commonly called "leader" be produced on each end of the tape. These sections are characterized either by multiple punching of a special leader advance or run-in code, or by the presence of sprocket feed holes only. Assuming here that it is desired to punch a special leader advance code, diodes 83 (Fig. 4C) are plugged into the diode symbol encoding board 84 to connect one of the input conductors to the board with the ones of the punch selecting magnets PS1 to PS8 inclusive, that will be used in punching the run-in code. In this case, the punch selecting magnets PS1 to PS6 are utilized. The return circuit for the punch selecting magnets is carried over conductor 85, back to the recorder operating circuit 82. The manner in which the recorder operating circuit functions to provide a signal on the input conductor to which the diodes 83 are connected is fully described in the previously cited application, Serial No. 550,728, to which reference may be had for a further discussion thereof. Energization of the punch selecting magnets PS1 to PS6 inclusive causes selection of the associated punches for perforating the tape, and enables the punch selecting levers to close other contacts to initiate a punching cycle of the punching mechanism, and thus cause the run-in code to be punched into the tape. Punching will continue so long as a leader advance push button, which is used for initiation of the leader advance operation, is depressed.

After a section of "leader" has been punched into the tape, a machine cycle of the data input machine may be initiated by the machine operator. At a predetermined point in this cycle, after all selector switches, etc. have been properly positioned, a mechanism in the data input machine closes the start-record switch contacts in the recorder operating circuit 82 to start recorder operation. This completes a circuit in the manner described in the previously cited application, Serial No. 550,728, from the recorder operating circuit 82 (Fig. 4A) over a conductor 86, to a terminal 87 (Fig. 4B) in a section 88 of the data input machine selection board 89. This terminal is connected by a plugboard connector 90 (represented by a dashed line in Fig. 4B) to a second terminal 91 in the section 88, which is connected to the wiper of a program selector switch CRB1 (Fig. 4A) over a conductor 92.

The contacts of switch CRB1 are connected over conductors in a cable 93 to terminals in a section 94 of the selection board 89. Another section 95 of the selection board 89 has its terminals connected over conductors in a cable 96 to the wipers of the various levels I through VIII (Fig. 4D) of the stepping switch 50. For purposes of illustration, let it be assumed that the No. 1 terminal in section 94 has been connected by a plugboard connector 97 to a program I terminal in section 95 of the board 89 to select the I punching program. Also, let it be assumed that the wiper of switch CRB1 has been differentially positioned during operation of the data input machine to engage its No. 1 contact.

The above circuit, which has been traced to the wiper of switch CRB1 will then continue from the wiper of said switch through a conductor connected to its No. 1 contact, to a corresponding terminal in section 94 of the board 89; from there over the plugboard connector 97 to a program I terminal in section 95 of the board 89, and thence over a conductor in the cable 96 to the wiper of level I of the stepping switch 50. Since the wiper of said switch is positioned to engage a terminal 98 at the beginning of a recording operation, the circuit will continue through terminal 98, and a conductor 63, which is the same as the conductor 63 of Fig. 1, back to the recorder operating circuit 82 of Fig. 4A.

As described in the previously mentioned application, Serial No. 550,728, this causes the stepping switch magnet SS1 in the recorder operating circuit 82 to be de-energized, which releases the wiper driving spring and advances the stepping switch wipers to their first position. The apparatus is now ready to record data that is required by position No. 1 of the punching program I, which data may be fixed data, which is the same in all recordings under control of program I, or variable data which may be set up in the data input machine and may vary in different recording operations using program I.

Figure 4B:
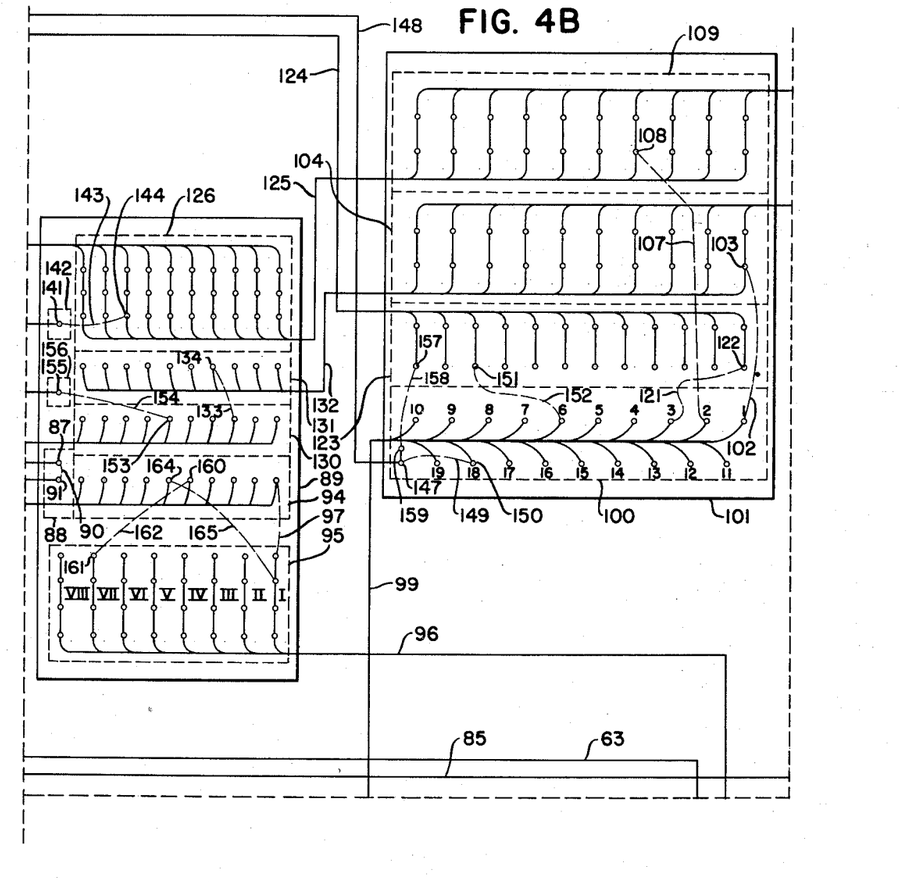
Figure 4C:
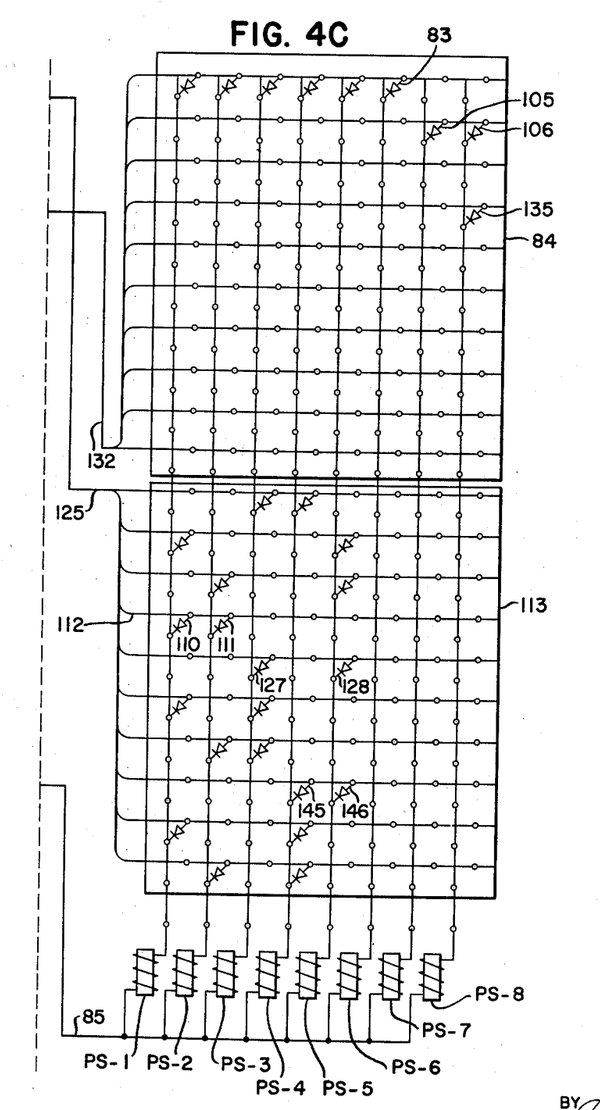
Figure 4D:
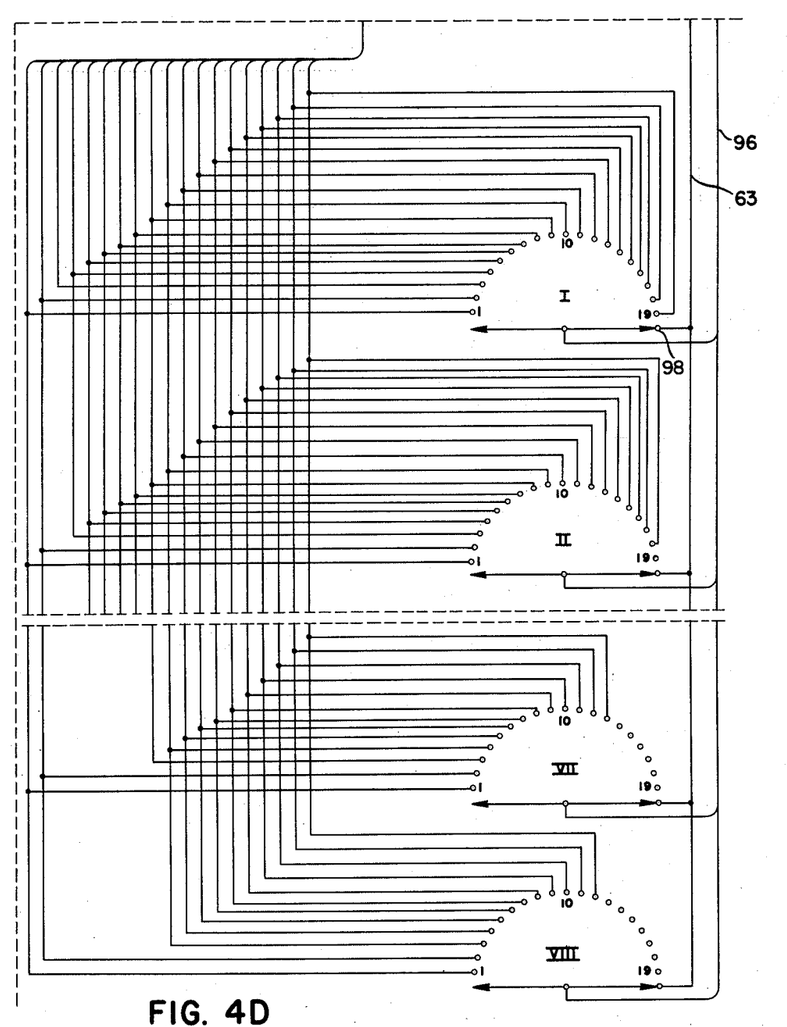

Referring now to Figs. 4B and 4D, it will be seen that the contacts of the various levels I through VIII (levels III through VI not being shown) are interconnected by conductors to produce a network which is equivalent to the interconnection of contacts shown in Fig. 1. Contact positions 1 and 2 of all of the levels I to VIII are connected to the same common conductors, while contact positions 3 to 19 of all of the levels I to VIII are connected to common conductors in such a fashion that, for example, contact 10 of level I, contact 9 of level II, contact 4 of level VII, and contact 3 of level VIII are connected to the same common conductor. A total of nineteen common conductors is thus provided, and these are carried in a cable 99 to corresponding terminals 1 to 19 in a section 100 (Fig. 4B) of a recorder program board 101.

Assume that the first punching operation in program I will be to punch a fixed symbol, an end-of-frame symbol, for example. During the setting up of the circuits to make up program I, a plugboard connector, represented in Fig. 4B by a broken line 102, would be connected from the No. 1 terminal for program I in section 100 of the program board 101, to a terminal 103 in a special symbol section 104 of the board 101. Also, two diodes 105 and 106, would be inserted in the symbol line No. 1 on the diode symbol encoding board 84, diode 105 making an electrical connection to punch selecting magnet PS7 and diode 106 making an electrical connection to punch selecting magnet PS8.

Now, as the wipers of the stepping switch 50 reach position No. 1, a circuit is completed to the No. 1 terminal of program I in section 100 of the program board 101. From here the circuit continues via the plugboard connector 102, through the terminal 103 in section 104 of the board 101, and a conductor in a cable 132, through symbol line No. 1 on the diode symbol encoding board 84, through the diodes 105 and 106, to the punch selecting magnets PS7 and PS8. As magnets PS7 and PS8 energize, they trip their related punch-selecting levers, causing contacts in the punching mechanism to close, thus initiating a punching cycle. During this punching cycle, holes will be punched in tape channels 7 and 8 to record an end-of-frame symbol, and the stepping switch wiper will be advanced to its No. 2 position.

Assuming that the second punching operation of program I will be utilized to record fixed data in the form of a one-digit identification number, for example, a 3, then position No. 2 terminal for program I in section 100 of the program board 101 will be connected by a plugboard connector 107 to a "3" digit terminal 108 in a digit section 109 of the program board 101. Also, two diodes 110 and 111 will be inserted in the No. 3 digit line 112 on the diode digit encoding board 113 (Fig. 4C), diode 110 making an electrical connection to punch selecting magnet PS1, and diode 111 making an electrical connection to punch selecting magnet PS2.

As the wipers of the stepping switch 50 reach position No. 2, the circuit is completed to the No. 2 terminal of program board 101. From here the circuit continues via the plugboard connector 107, through the terminal 108 in the section 109 of the board 101, and a conductor in a cable 125, through the No. 3 digit line 112 on the diode digit encoding board 113, through the diodes 110 and 111, to the punch selecting magnets PS1 and PS2. As these magnets energize, they trip their related punch selecting levers, causing contacts in the punching mechanism to close, thus initiating a punching cycle during which holes will be punched in tape channels 1 and 2 to record a "3" digit, and the stepping switch wiper will be advanced to its No. 3 position.

The manner in which the recording of variable data is accomplished under control of the data input machine will now be explained.

The circuit for recording variable data under control of the data input machine is similar to the circuit for recording fixed data, up to the point where the plugboard connectors connect the various positions of the stepping switch to the data selecting means. In the case of the variable data recording operations, the plugboard connectors connect the terminals for the various positions of the stepping switch to the wipers of the required ones of the data input machine selector switches CRS1 to CRS9 (Fig. 4A), only three of these switches being actually shown, and CRA1 in the required sequence to read out the data, according to the setting of the switches. The switches CRS1 to CRS9 are operatively connected to the amount rows of the data input machine, and their wipers are set according to the amounts indexed on these various rows. The switch CRA1 is connected to the control row of the data input machine and its wiper is operatively coupled to that of CRB1, so that the wipers of these two switches are positioned in unison, according to the setting of the control row of the data input machine.

Suppose, for example, that it is desired that information from switch CRS1 of the data input machine is to be recorded from the No. 3 position in program I. When program I is being set up in the recorder, a plugboard connector, represented in Fig. 4B by a broken line 121, must be connected between the No. 3 terminal of program I in the section 100 of the program board 101, and a read-out terminal 122 for row 1 in the read-out section 123 of the program board 101. The terminal 122 is connected to a conductor in a cable 124, which conductor in turn is connected to the wiper of the digit selector switch CRS1 (Fig. 4A), which is set according to data entered in row 1 of the input machine.

Assuming, as an illustration, that the No. 4 key in row 1 were depressed, then in an operation of the data input machine, the digit selector switch CRS1 would be mechanically positioned with its wiper on the No. 4 contact.

As shown in Fig. 4A, corresponding digit contacts of each selector switch CRS1 to CRS9 are connected together by a conductor in the cable 125, which extends through a digit section 126 in the selection board 89, and the digit section 109 in the program board 101, to the corresponding digit lines on the diode digit encoding board 113. With switch CRS1 set to the No. 4 position, the wiper arm of the selector switch CRS1 will complete a circuit from the No. 3 terminal of program I, over connector 121, terminal 122, the proper conductor in cable 124, the selector switch CRS1, and the No. 4 conductor in cable 125, to the No. 4 input digit line of the diode digit encoding board 113. Diodes plugged in between the digit line and the punch selecting magnets cause voltage applied to the magnets to cause their related punches to be selected to initiate a punching cycle. In the illustrated showing in Fig. 4C, diodes 127 and 128 have been inserted in the No. 4 digit line on the diode digit encoding board 113, diode 127 making an electrical connection to punch selecting magnet PS3 and diode 128 making an electrical connection to punch selecting magnet PS5. A digit "4" is therefore caused to be recorded on the tape by punching holes in tape channels 3 and 5. During the recording of the digit "4," the stepping switch 50 is advanced to the No. 4 position.

It is to be noted that the circuit to the wiper of a selector switch, such as CRS1, can be switched to any of the digit conductors in the cable 125, depending on the particular setting of the switch, and this enables variable data to be punched under control of the data input machine.

In a similar manner the terminals for the remaining steps of program I can be connected by plugboard connectors to other selector switches or sources of fixed data, as required.

As described earlier, the program selector switch CRB1 is used to select a punching program. This switch has its punch selector counterpart, switch CRA1, which is set to an identical position therewith and can be utilized to control the punching of a symbol or digit to indicate the significance of the data being punched. The contacts of this switch CRA1 are connected to a row of terminals in a section 130 of the selection board 89, and can be connected by plugboard connectors to terminals in the digit section 126 on the selection board 89 which, as has been stated, are connected to corresponding digit conductors in the cable 125, or can be connected to terminals in a symbol section 131 on the selection board 89, which terminals are connected over conductors in a cable 132, to the corresponding symbol section 104 on the program board 101, and thence to input conductors of the diode symbol encoding board 84. The wiper of the switch CRA1 is connected by one of the conductors in the cable 124 to a corresponding terminal in the read-out section 123 of the program board 101 (Fig. 4B). This terminal may be connected by a plugboard connector to the desired one of the stepping switch contact position terminals in the section 100 of the program board 101. Accordingly, the punch selector switch CRA1 may be programmed to cause any desired digits or symbols to be punched for the various positions of the switch CRA1.

For purposes of illustration, let it be assumed that in section 130 of the selection board 89, the No. 2 terminal related to switch CRA1 is connected by a plugboard connector, represented in Fig. 4B by the broken line 133, to a terminal 134 in the section 131 of the board 89. Then, with the wiper of the control punch selector switch CRA1 positioned to its No. 2 contact, a circuit to the wiper from a stepping switch terminal over a conductor in the cable 124 is switched by the switch CRA1 to the No. 2 terminal in section 130, then over the plugboard connector 133, the terminal 134, the conductor in the cable 132, input symbol line No. 3 on the diode symbol encoding board 84, and a diode 135, to the punch selecting magnet PS8. Voltage applied to this magnet would initiate a punch cycle, causing a symbol represented by a hole in tape channel 8 to be recorded.

In some instances it may be desirable to cause a fixed symbol to be punched whenever the wiper of a particular selector switch is positioned to a particular position. This might be utilized, for example, when one of the amount rows is used to index a classification number relating to a particular type of transaction. It might be convenient in such a case to have the most common type of transaction be represented by a classification number or symbol, which would be punched automatically whenever no entry at all was made in that particular row, so that for a large percentage of the transactions the operator would be spared the necessity of operating a key in that row. Means to permit this type of operation is shown in Figs. 4A and 4B, where the zero position of the row 9 selector switch CRS9 is connected over a conductor 140 to a terminal 141 in a section 142 of the selection board 89. A plugboard connector may then be used to connect the terminal 141 to a selected terminal in either the digit section 126 or the symbol section 131 of the board 89, so that whenever the zero position of the switch CRS9 is selected, a corresponding digit or symbol will automatically be punched in the tape. Since the selection of a digit or symbol is accomplished by means of connecting the terminal 141 to the selected terminal in either the section 126 or 131, the digit or symbol to be used may readily be changed if the accounting system is altered, or if the data input machine is moved to a different department for a different use.

As shown for purposes of example in Fig. 4B, a plugboard connector 143 connects the terminal 141 of section 142 with a terminal 144 in the digit section 126 of the selection board 89. Then, with the wiper of the selector switch CRS9 positioned to its zero position by virtue of no key having been depressed in that row, a circuit from the wiper from a stepping switch terminal over a conductor in the cable 124 is switched by the switch CRS9 over the conductor 140 to the terminal 141 in section 142 of the board 89, and then over the plugboard connector 143, the terminal 144, the conductor in cable 125, the input digit line No. 7 on the diode digit encoding board 113, and the diodes 145 and 146 to the punch selecting magnets PS4 and PS5. Voltage applied to these magnets initiates a punch cycle, causing a digit 7, represented by holes in channels 4 and 5 of the tape, to be recorded.

After recording all of the information included in one program, it is necessary to cause the wipers of the stepping switch 50 to return to their "home" position. A reset terminal 147, located in section 100 of the program board 101 (Fig. 4B) is provided for this purpose, said terminal being connected over a conductor 148 to the recorder operating circuit 82 (Fig. 4A). The programming necessary to accomplish the resetting function requires a plugboard connector, such as is shown in broken lines at 149 in Fig. 4B. The connector 149 connects the reset terminal 147 to a terminal 150 in section 100 of the program board 101. The terminal 150 will be considered to be the one immediately following the position of the last recorded data of the program.

When the wiper of the stepping switch 50 is stepped to a contact connected to the terminal 150, a circuit is completed through the selected level of the stepping switch, terminal 150, connector 149, reset terminal 147, and the conductor 148 to the recorder operating circuit 82 (Fig. 4A). The recorder operating circuit then causes the stepping switch magnet SS1 to be successively energized and deenergized, thus stepping the stepping switch through the remainder of its contact positions, and returning it to home position. The manner in which the recorder operating circuit accomplishes this is clearly set forth in the previously mentioned United States application, Serial No. 550,728. The system has now recorded all of the information required by this program. It is now ready to repeat this program, or to record information from any of the other programs which have been set up.

Additional means are provided for initiating a reset operation prior to the stepping of the stepping switch all of the way to the contact corresponding to the terminal 150. This additional means is controlled by the operator according to the setting of one of the switches CRS1 to CRS9 and CRA1, and is programmable to permit its being changed in accordance with the various uses to which the recording system may be put. Since this reset means is under the control of the operator, it will be termed "optional reset."

To illustrate the operation of the optional reset means, let it be assumed that whenever the control row of the data input machine is set to its No. 5 position by the operator, it is desired to utilize the optional reset means and thus conclude the program immediately, instead of proceeding through the remainder of the program to the normal reset position, and punching information under control of the remaining program contact positions. Let it also be assumed that it is desired to read out the switch CRA1, which is set by the control row, at the sixth step of program I, and that the terminal 151 in the section 123 of the program board 101 is connected by a conductor in the cable 124 to the wiper of the switch CRA1.

In order to complete the programming to provide optional reset means in accordance with the above conditions, the No. 6 terminal of section 100 of the program board 101 is connected by a plugboard connector 152 to the terminal 151 of the section 123. This connects the No. 6 terminal of the section 100 to the wiper of the switch CRA1. Next, a terminal 153 of the section 130 of the selection board 89, which terminal is connected to the No. 5 position of the switch CRA1, is connected by a plugboard connector 154 to a terminal 155 of a section 156 on the selection board 89. This terminal 155 is connected to a conductor in the cable 124, which conductor is connected at its other end to a terminal 157 in the read-out section 123 of the program board 101. A third plugboard connector 158 is then used to connect the terminal 157 to a terminal 159, which is bussed to the reset terminal 147 in section 100 of the program board 101.

In addition, a plugboard connector 165 is used to connect a terminal 164 in the section 94 of the selection board 89, which terminal is connected to the No. 5 position of the switch CRB1, to a program I terminal in the section 95 of the board 89. Position No. 5 of the control row of the data input machine is thereby rendered effective to select program I through the program selector switch CRB1.

It will, therefore, be seen that when program I has been selected by indexing the control row to position 5, and the stepping switch 50 steps to its No. 6 position, a circuit is completed over the No. 6 terminal in section 100, connector 152, terminal 151, and its corresponding conductor in cable 124, contact position 5 of switch CRA1, terminal 153 in section 130 of selection board 89, connector 154, terminal 155, its corresponding conductor in cable 124, terminal 157, connector 158, terminal 159 bussed to terminal 147, and the conductor 148 back to the recorder operating circuit 82 (Fig. 4A). The recorder operating circuit then causes a resetting operation to take place in the same manner as a normal resetting operation.

The optional reset means described above permits variation in a program under control of the machine operator. This greatly enhances the flexibility and capability of the machine since it, in effect, provides additional programs which may be used in capturing of information on the record tape. Of course, it will be seen that, if desired, a number of optional reset means, rather than a single optional reset means, could be provided in a given program, or in different programs, which would increase the flexibility and capability of the recording system still further.

While the above operations were carried out under program I, it should be recalled that seven other programs are available in the illustrated embodiment, and these may be used to provide different sequences of punching fixed and variable information, according to the different uses to which the data processing system may be put.

In order to make available the additional programs II through VIII, terminals in section 94 of the selection board 89 are connected to terminals in section 95 of the board 89, in the desired arrangement. For example, if a terminal 160 of section 94 is connected to a terminal 161 of section 95, by means of a plugboard connector 162, then when the wiper of the program selector switch CRB1 is set to position No. 4 by appropriate indexing of the control row of the data input machine in a machine operation, program VII will be selected. With this arrangement, voltage will be applied from the recorder operating circuit 82 over the conductor 86, the terminal 87, the connector 90, the terminal 91, the conductor 92, position 4 of the switch CRB1, the corresponding conductor in the cable 93, the terminal 160, the connector 162, the terminal 161, and the corresponding conductor in the cable 96 to level VII of the stepping switch 50. It may be seen from an examination of the wiring network connecting the various levels of the stepping switch 50 in Fig. 4D, that as the wiper of the stepping switch level VII sequentially steps through its various positions, voltage will be applied sequentially to terminals 1, 2 and 9 through 18 of section 100 of the program board 101. No voltage is applied to terminals 3 through 8 of the section 100 of the board 101 in program VII, and consequently no reading out of fixed or variable information from components connected to these terminals can take place. In a similar manner, different programs are provided by the other levels of the stepping switch 50.

It should also be noted that the optional reset means described above may be utilized in conjunction with these various programs, and a very large number of sequential routines may thus be obtained from the single set of terminals 1 through 19 in section 100 of the program board 101.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. A programming device comprising a multiple-level switching means, each level having a plurality of contacts and a wiper for sequentially contacting the contacts, corresponding contacts of the various levels forming parallel rows, the wipers of the various levels being electrically isolated from each other and being operable in unison, so that said wipers are always correspondingly positioned on the various levels; program control means for applying an input signal selectively to any one of the wipers; driving means for driving the wipers sequentially from row to row; a plurality of parallel inter-level connecting means extending diagonally of the rows for connecting together a plurality of different contacts in successively different rows of successive levels; separate output means connected to each of the connecting means, whereby output signals may be obtained from the various output means in different sequences to form different programs according to which of the wipers an input signal is applied; reset means for operating the driving means to drive the wipers sequentially to a home position upon completion of the selected program; and coupling means for coupling the reset means to a selected one of the separate output means, so that when the wiper of the selected level contacts the contact connected to the selected output means, a signal is transmitted over the coupling means to the reset means to cause the driving means to drive the wipers sequentially to home position.

2. A programming device comprising a multiple-level switching means, each level having a plurality of contacts and a wiper for sequentially contacting the contacts, corresponding contacts of the various levels forming parallel rows, the wipers of the various levels being electrically isolated from each other and being operable in unison, so that said wipers are always correspondingly positioned on the various levels; program control means for applying an input signal selectively to any one of the wipers; driving means for driving the wipers sequentially from row to row; a plurality of parallel inter-level connecting means extending diagonally of the rows for connecting together a plurality of different contacts in successively different rows of successive levels; separate output means connected to each of the connecting means, whereby output signals may be obtained from the various output means in different sequences to form different programs according to which of the wipers an input signal is applied; reset means for operating the driving means to drive the wipers sequentially to a home position upon completion of the selected program; first coupling means for coupling the reset means to a selected one of the separate output means, so that when the wiper of the selected level contacts the contact connected to the selected output means, a signal is transmitted over the coupling means to the reset means to cause the driving means to drive the wipers sequentially to home position; and second coupling means controlled by the program control means for transmitting a signal to the reset means to cause the driving means to drive the wipers sequentially to home position, thus effecting a reset operation prior to the normal completion of the selected program.

3. A programming device comprising a multiple-level switching means, each level having a plurality of contacts and a wiper for sequentially contacting the contacts, corresponding contacts of the various levels forming parallel rows, the wipers of the various levels being electrically isolated from each other and being operable in unison, so that said wipers are always correspondingly positioned on the various levels; driving means for driving the wipers sequentially from row to row; a plurality of parallel inter-level connecting means extending diagonally of the rows for connecting together a plurality of different contacts in successively different rows of successive levels; separate output means connected to each of the connecting means, whereby output signals may be obtained from the various output means in different sequences to form different programs according to which of the wipers an input signal is applied; reset means for operating the driving means to drive the wipers sequentially to a home position; program control means; first multiple-position switching means responsive to the program control means for applying an input signal selectively to any one of the wipers for selection of a program; and second multiple-position switching means responsive, in unison with the first multiple-position switching means, to the program control means and operatively coupled to the reset means to cause the wipers of the multiple-level switching means to be reset to home position, thus controlling the length of the selected program.

4. A programming device comprising a multiple-level switching means, each level having a plurality of contacts and a wiper for sequentially contacting the contacts, corresponding contacts of the various levels forming rows, the wipers of the various levels being electrically isolated from each other and being operable in unison, so that all of said wipers are positioned at the same row at any given time; means for driving the wipers sequentially from row to row in unison; means for applying an input signal selectively to any one of the wipers; a plurality of output conductors interconnecting the contacts of the rows in the several levels, each conductor connecting a contact in one row of one level to a contact in the next row in sequence in the next level, thereby providing parallel diagonal connections, whereby different program sequences are obtained from the output conductors according to the wiper selected for an input signal.

5. A programming device comprising a matrix of contacts arranged in rows and levels; a plurality of conductors extending transversely across the matrix and interconnecting the contacts of different rows and levels; a plurality of wipers, one for each level; driving means to drive said wipers step by step in unison to contact their respective contacts sequentially; means for applying an input signal selectively to any one of the wipers, whereby different program sequences are obtained from the conductors by the application of an input signal to different wipers; reset means for operating the driving means to drive the wipers sequentially to a home position upon completion of the selected program; and coupling means for coupling the reset means to a selected one of the conductors so that when the wiper of the selected level contacts the contact connected to the selected conductor, a signal is transmitted over the coupling means to the reset means to cause the driving means to drive the wipers sequentially to home position.

6. A programming device comprising a matrix of contacts arranged in rows and levels; a plurality of conductors extending transversely across the matrix and interconnecting the contacts of different rows and levels; a plurality of wipers, one for each level; driving means to drive said wipers step by step in unison to contact their respective contacts sequentially; program control means for applying an input signal selectively to any one of the wipers, whereby different program sequences are obtained from the conductors by the application of an input signal to different wipers; reset means for operating the driving means to drive the wipers sequentially to a home position upon completion of the selected program; first coupling means for coupling the reset means to a selected one of the conductors, so that when the wiper of the selected level contacts the contact connected to the selected conductor, a signal is transmitted over the coupling means to the reset means to cause the driving means to drive the wipers sequentially to home position; and second coupling means controlled by the program control means for transmitting a signal to the reset means to cause the driving means to drive the wipers sequentially to home position, thus effecting a reset operation prior to the normal completion of the selected program.

7. A programming device comprising a matrix of contacts arranged in rows and levels; a plurality of conductors extending transversely across the matrix and interconnecting the contacts of different rows and levels; a plurality of wipers, one for each level; driving means to drive said wipers step by step in unison to contact their respective contacts sequentially; reset means for operating the driving means to drive the wipers sequentially to a home position; program control means; first multiple-position switching means responsive to the program control means for applying a signal selectively to any one of the wipers to obtain a desired program sequence from the conductors; and second multiple-position switching means responsive, in unison with the first multiple-position switching means, to the program control means and operatively coupled to the reset means to cause the wipers of the multiple-level switching means to be reset to home position, thus controlling the length of the selected program sequence.

8. A programming device comprising a multiple-level switching means, each level having a plurality of contacts and a wiper for sequentially contacting the contacts, corresponding contacts of the various levels forming parallel rows, the wipers of the various levels being electrically isolated from each other and being operable in unison, so that said wipers are always correspondingly positioned on the various levels; program control means for selecting a desired program by applying an input signal selectively to any one of the wipers; an operating circuit including driving means for driving the wipers sequentially from row to row and also including reset means for controlling said driving means to return the wipers to a home position at the conclusion of a selected program; a plurality of parallel inter-level connecting means extending diagonally of the rows for connecting together a plurality of different contacts in successively different rows of successive levels; separate output means connected to each of the connecting means and terminating in a program board, whereby output signals may be obtained from the program board in different sequences to form different programs according to which of the wipers an input signal is applied; a reset conductor coupled to the reset means and terminating in the program board; and coupling means associated with the program board and connecting a selected one of the separate output means to the reset conductor so that when the wiper of the selected level contacts the contact connected to the selected output means, a signal is transmitted over the coupling means and the reset conductor to the reset means to cause the driving means to drive the wipers sequentially to home position.

9. A programming device comprising a multiple-level switching means, each level having a plurality of contacts and a wiper for sequentially contacting the contacts, corresponding contacts of the various levels forming parallel rows, the wipers of the various levels being electrically isolated from each other and being operable in unison so that said wipers are always corespondingly positioned on the various levels; program control means for selecting a desired program by applying an input signal selectively to any one of the wipers; an operating circuit including driving means for driving the wipers sequentially from row to row and also including reset means for controlling said driving means to return the wipers to a home position at the conclusion of a selected program; a plurality of parallel inter-level connecting means extending diagonally of the rows for connecting together a plurality of different contacts in successively different rows of successive levels; separate output means connected to each of the connecting means and terminating in a program board, whereby output signals may be obtained from the program board in different sequences to form different programs according to which of the wipers an input signal is applied; a reset conductor coupled to the reset means and terminating in the program board; first coupling means associated with the program board and connecting a selected one of the separate output means to the reset conductor so that when the wiper of the selected level contacts the contact connected to the selected output means, a signal is transmitted over the first coupling means and the reset conductor to the reset means to cause the driving means to drive the wipers sequentially to home position; optional reset operating means controlled by the program control means for selectively initiating a reset operation prior to the normal completion of the selected program, and including an optional reset conductor coupled to said optional reset operating means and terminating in the program board; and second coupling means associated with the program board and connecting the optional reset conductor to the reset conductor, so that a signal is transmitted from the optional reset operating means over the optional reset conductor, the second coupling means and the reset conductor to the reset means to cause the driving means to drive the wipers sequentially to home position.

10. A programming device comprising a multiple-level switching means, each level having a plurality of contacts and a wiper for sequentially contacting the contacts, corresponding contacts of the various levels forming parallel rows, the wipers of the various levels being electrically isolated from each other and being operable in unison so that said wipers are always correspondingly positioned on the various levels; program control means; first multiple-position switching means responsive to the program control means for selecting a desired program by applying an input signal selectively to any one of the wipers; and operating circuit including driving means for driving the wipers sequentially from row to row and also including reset means for controlling said driving means to return the wipers to a home position at the conclusion of a selected program; a plurality of parallel inter-level connecting means extending diagonally of the rows for connecting together a plurality of different contacts in successively different rows of successive levels; separate output means connected to each of the connecting means and terminating in a program board, whereby output signals may be obtained from the program board in different sequences to form different programs according to which of the wipers an input signal is applied; a reset conductor coupled to the reset means and terminating in the program board; and second multiple-position switching means responsive, in unison with the first multiple-position switching means, to the program control means and operatively coupled through the reset conductor to the reset means to cause the driving means to drive the wipers sequentially to home position, thus controlling the length of the selected program.

11. A programming device comprising a multiple-level switching means, each level having a plurality of contacts and a wiper for sequentially contacting the contacts, corresponding contacts of the various levels forming parallel rows, the wipers of the various levels being electrically isolated from each other and being operable in unison, so that said wipers are always correspondingly positioned on the various levels; a multiple-position program control switch including a wiper and a plurality of contacts; operating circuit means for applying an electrical signal to the program control switch; variable programming means for connecting the contacts of the program control switch to selected levels of the multiple-level switching means, according to the programs desired to be selected by predetermined positions of the program control switch, the electrical signal thereby being applied to a selected level of the multiple-level switching means; means for driving the wipers of the multiple-level switching means sequentially from row to row; a plurality of parallel inter-level connecting means extending diagonally of the rows for connecting together a plurality of different contacts in successively different rows of successive levels; and separate output means connected to each of the connecting means and terminating in a program board, whereby output signals may be obtained from the program board in different sequences according to which of the wipers of the multiple-level switching means an input signal is applied.

References Cited in the file of this patent

UNITED STATES PATENTS

| | | |
|---|---|---|
| 2,139,676 | Friedman | Dec. 13, 1938 |
| 2,200,351 | Whitehead | May 14, 1940 |
| 2,405,991 | Beverage | Aug. 20, 1946 |
| 2,682,046 | Hack | June 22, 1954 |
| 2,690,548 | Joel | Sept. 28, 1954 |
| 2,785,224 | Ehart | Mar. 12, 1957 |
| 2,832,901 | Turner | Apr. 29, 1958 |
| 2,835,042 | Tandler et al. | May 20, 1958 |